United States Patent
Fujisawa

(10) Patent No.: US 9,378,129 B2
(45) Date of Patent: Jun. 28, 2016

(54) INFORMATION PROCESSING APPARATUS, CONTROL METHOD, AND STORAGE MEDIUM FOR MEMORY MANAGEMENT AND DUMP PROCESSING BASED ON MEMORY USAGE

(71) Applicant: CANON KABUSHIKI KAISHA, Tokyo (JP)

(72) Inventor: Kunimasa Fujisawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 14/044,101

(22) Filed: Oct. 2, 2013

(65) Prior Publication Data
US 2014/0108762 A1    Apr. 17, 2014

(30) Foreign Application Priority Data
Oct. 11, 2012   (JP) .................... 2012-226328

(51) Int. Cl.
G06F 3/06 (2006.01)
G06F 11/07 (2006.01)
G06F 12/02 (2006.01)
G06F 12/12 (2016.01)

(52) U.S. Cl.
CPC ............ G06F 12/023 (2013.01); G06F 3/0608 (2013.01); G06F 11/0733 (2013.01); G06F 11/0793 (2013.01); G06F 12/126 (2013.01)

(58) Field of Classification Search
CPC ............. G06F 3/0608; G06F 9/45504; G06F 11/0712; G06F 11/073; G06F 11/0733; G06F 12/023; G06F 12/0253
See application file for complete search history.

(56) References Cited

U.S. PATENT DOCUMENTS

| | | | |
|---|---|---|---|
| 2006/0136530 A1* | 6/2006 | Rossmann | G06F 11/366 |
| 2006/0206885 A1* | 9/2006 | Seidman | G06F 11/073 717/148 |
| 2007/0038939 A1* | 2/2007 | Challen | G05B 15/02 715/734 |
| 2009/0187614 A1* | 7/2009 | Clee | G06F 12/0253 |
| 2011/0107038 A1* | 5/2011 | Akiyama | G06F 12/0269 711/154 |
| 2012/0324199 A1* | 12/2012 | Yamashita | G06F 12/0269 711/170 |
| 2013/0055034 A1* | 2/2013 | Qiu | G06F 11/076 714/47.1 |
| 2014/0068341 A1* | 3/2014 | Martineau | G06F 11/34 714/38.11 |

FOREIGN PATENT DOCUMENTS

JP          2009-193511 A        8/2009

* cited by examiner

*Primary Examiner* — Hal Schnee
(74) *Attorney, Agent, or Firm* — Carter, DeLuca, Farrell & Schmidt, LLP

(57) ABSTRACT

The present information processing apparatus compares a size of a used memory that is currently used for execution of an application with a stored maximum size of a memory used by the application. Dump processing for writing memory contents to an external storage device is not executed when the result of the comparison shows that the size of the used memory is smaller than or equal to the maximum size, and is executed when the result of the comparison shows that the size of the used memory is larger than the maximum size.

8 Claims, 14 Drawing Sheets

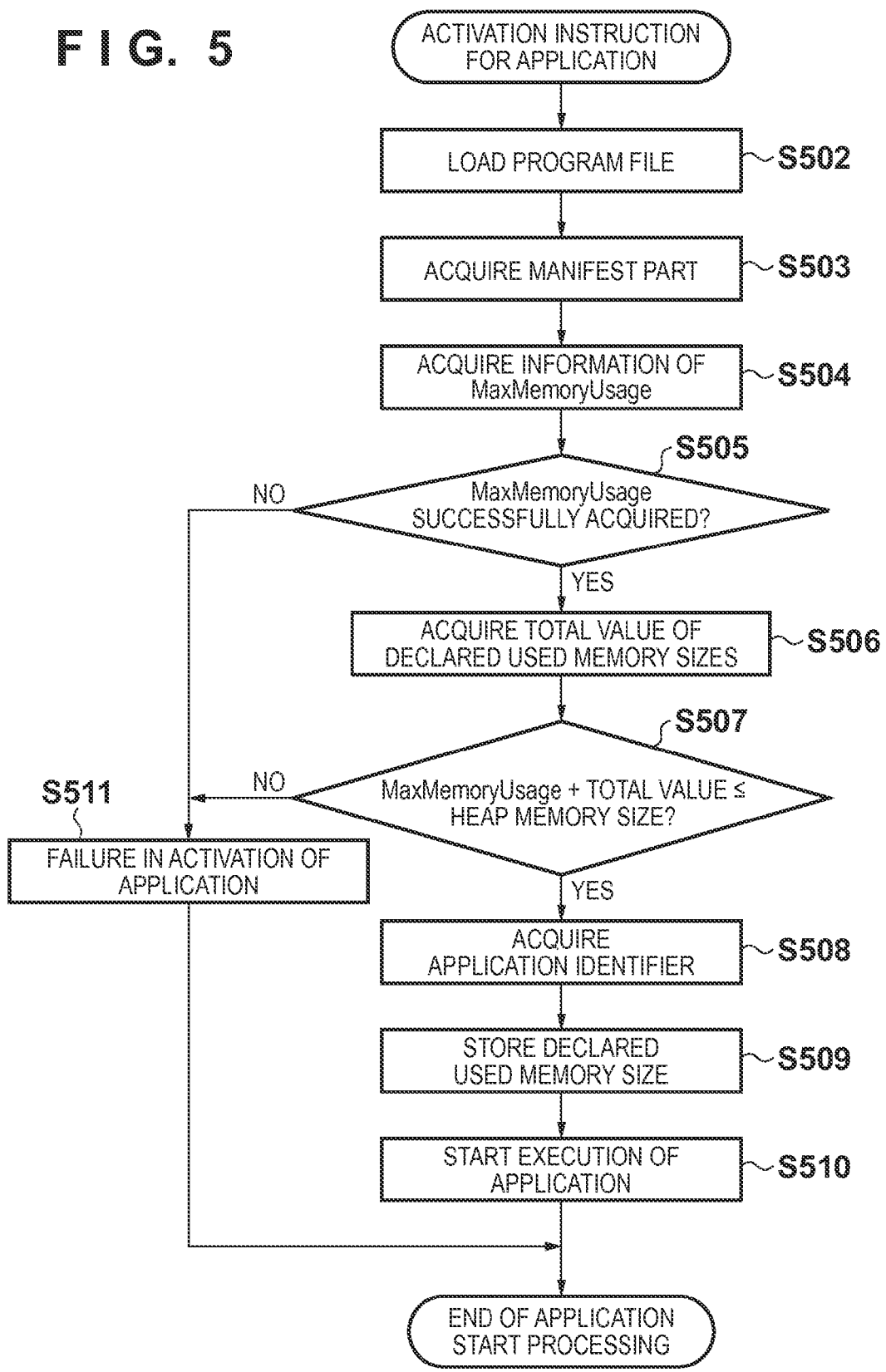
F I G. 5

F I G. 10
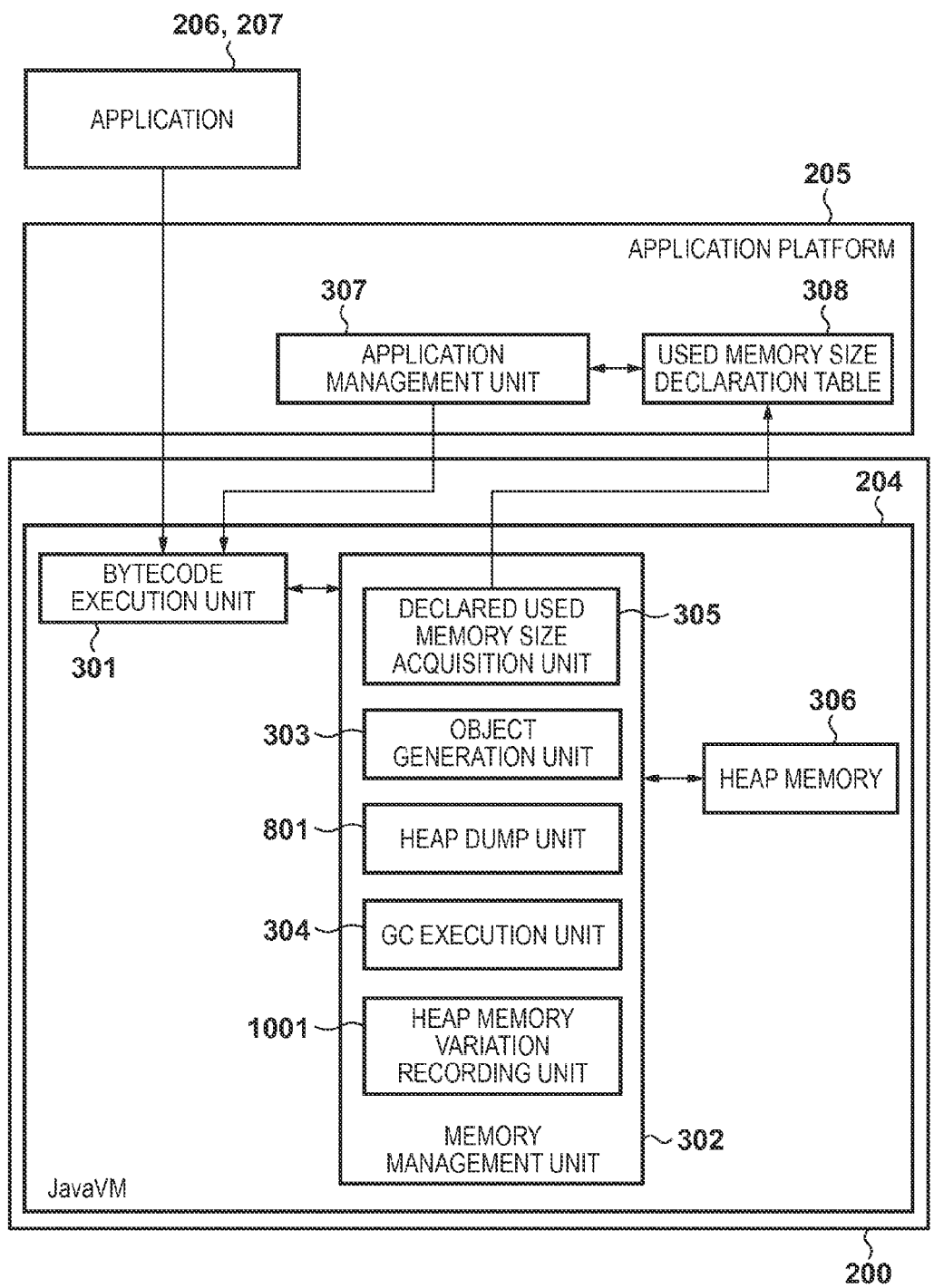

INFORMATION PROCESSING APPARATUS, CONTROL METHOD, AND STORAGE MEDIUM FOR MEMORY MANAGEMENT AND DUMP PROCESSING BASED ON MEMORY USAGE

BACKGROUND OF THE INVENTION

1. Field of the invention

The present invention relates to an information processing apparatus on which a plurality of applications run in a single process, a control method therefor, and a storage medium.

2. Description of the Related Art

Today, in order to realize solutions, more and more multifunction peripherals (MFPs) have a function of executing applications other than the functions built therein, such as copying, scanning and printing of documents. Many MFPs utilize a Java (registered trademark) execution environment as an application execution environment, and are capable of executing applications written in Java. One example of the application execution environment is Canon's MEAP. On a PC, one Java application is executed in one process. On the other hand, on many MFPs, a plurality of applications are executed in one Java process using an OSGi framework and the like because of CPU and memory limitations. For this reason, when a memory leak has occurred for one of the applications being executed on an MFP due to the presence of a bug therein, there is a possibility that the OutOfMemoryError occurs and all applications shut down.

The OutOfMemoryError occurs when no memory is allocable upon memory request by an application. That is to say, the OutOfMemoryError could occur during execution of trouble-free applications, thus making it difficult to identify an application for which a memory leak has occurred. The following two methods have been used to detect a memory leak. The first method is to monitor the states of objects generated by applications using a tool called a profiler. The second method is to analyze objects generated by applications by dumping out toe contents of a heap memory used by a Java VM (hereinafter referred to as a heap dump). Japanese Patent Laid-Open No. 2009-193511 suggests that, when core dump processing cannot be executed, the core dump processing be realized via connection to an attachable/detachable storage device.

However, the above conventional techniques have the following problems. For example, monitoring of the states of objects using a profiler drastically decreases the execution speed of applications, and is therefore difficult to apply to MFPs with significant CPU and memory limitations. Meanwhile, a conventional heap dump is manually executed at an arbitrary timing. This makes it difficult to dump out the contents of a heap memory immediately before the occurrence of the OutOfMemoryError, that is to say, at a timing most appropriate for the identification of an application for which a memory leak has occurred.

SUMMARY OF THE INVENTION

The present invention enables realization of a mechanism for improving the efficiency of failure chasing for an application by acquiring memory information when there is a high possibility that the application is running abnormally.

One aspect of the present invention provides an information processing apparatus comprising: an execution unit configured to execute an application; a storage unit configured, when the execution unit executes the application, to store a maximum size indicating a maximum memory size used by the application; an accepting unit configured to accept a memory request from the application; a comparing unit configured, when the accepting unit accepts the memory request, to compare a size of a used memory that is currently used for execution of the application with the maximum size of a memory used by the application, which is stored in the storage unit; and a memory management unit configured not to execute a dump processing when a result of the comparison by the comparing unit shows that the size of the used memory is smaller than or equal to the maximum size, and to execute the dump processing when the result of the comparison by the comparing unit shows that the size of the used memory is larger than the maximum size, the dump processing being for writing memory contents to an external storage device.

Further features of the present invention will be apparent from the following description of exemplary embodiments with reference to the attached drawings.

BRIEF DESCRIPTION OF THE DRAWINGS

FIG. 5 is a flowchart of activation processing for activating an application.

FIG. 10 shows an example of a configuration of an image processing apparatus of the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Processing Apparatus

Figure 1:
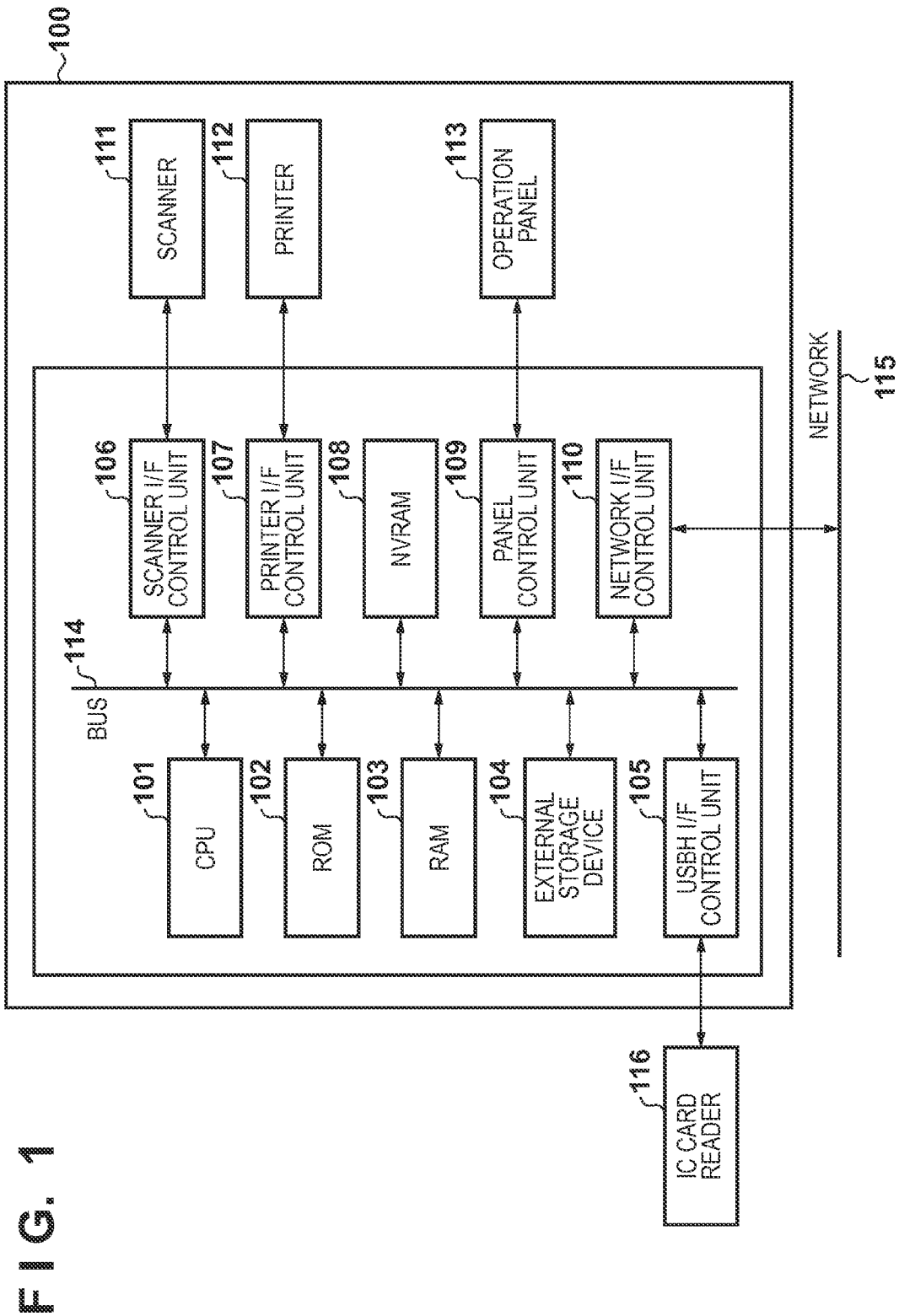
FIG. 1 shows an example of a configuration of an image processing apparatus.

First, a description is given of an example of a hardware configuration of an image processing apparatus, such as an MFP, with reference to FIG. 1. It should be noted that the following describes an image processing apparatus 100 as an example of an information processing apparatus of the present invention. The image processing apparatus 100 includes a CPU 101, a ROM 102, a RAM 103, an external storage device 104, a USBH I/F control unit 105, a scanner I/F control, unit 106, a printer I/F control unit 107, an NVRAM (non-volatile memory) 108, a panel control unit 109, a network I/F control unit 110, a scanner 111, a printer 112, and an operation panel 113.

The CPU 101 performs overall control of the entire image processing apparatus through execution of software programs of the image processing apparatus. The ROM 102, namely a read-only memory, stores boot programs and fixed parameters for the image processing apparatus. The RAM 103, namely a random-access memory, is used to, for example, temporarily store data when the CPU 101 controls the image processing apparatus. The external storage device 104 is used to store various types of data, such as installed applications, data of the applications, and printing data.

The USBH I/F control, unit 105 controls a USB host interface, hence communication with various types of USB devices. The scanner I/F control unit 106 is a device that controls the scanner 111. The printer I/F control unit 107 is a device that controls the printer 112.

The NVRAM 108, namely a non-volatile memory, stores various types of setting values for an application management apparatus. The panel control unit 109 controls the operation panel 113 so as to display various types of information and to input instructions from a user. The network I/F control unit 110 controls transmission and reception of data to and from a network 115. The CPU 101, ROM 102, RAM 103, external storage device 104, USBH I/F control unit 105, scanner I/F control unit 106, printer I/F control unit 107, NVRAM 108, panel control unit 109, and network I/F control unit 110 are connected to a bus 114. The bus 114 is a system bus via which control signals from the CPU 101 and data signals between various devices are transmitted and received. An IC card reader 116 is a USB device that performs authentication.

Control Structure

Figure 2:
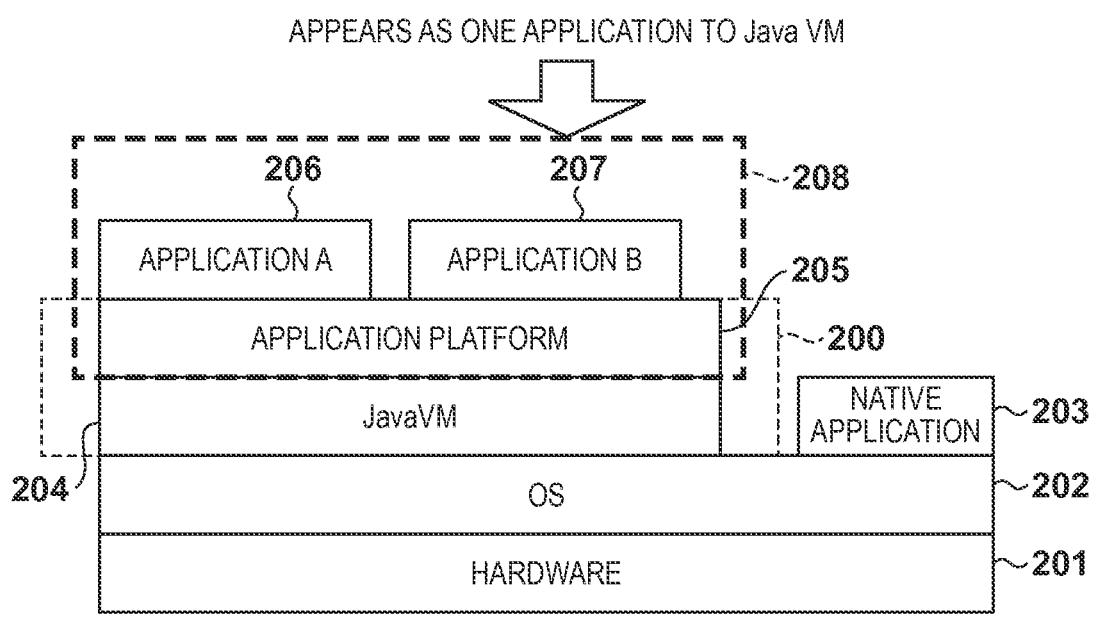
FIG. 2 shows an example of a software structure of an image processing apparatus.

Next, a description is given of an example of a control structure of a general image processing apparatus with reference to FIG. 2. Hardware 201 executes software of the application management apparatus. An operating system (OS) 202 manages processes, memories, and input/output. A native application 203 is a program that realizes fundamental functions of the image processing apparatus, such as copying.

Software 200 of the image processing apparatus is composed of a Java VM 204 and an application platform 205. The Java VM 204 is a virtual machine that executes Java programs. The application platform 205 is a program that manages application life cycles, such as activation, shutdown, installation and uninstallation of one or more application programs, on a single Java VM. An application A 206 and an application B 207 are application programs that run on the application platform 205. The application platform 205, application A 206, and application 207 are processed as one Java application 208 via the Java VM 204.

Module Configuration

Figure 3:
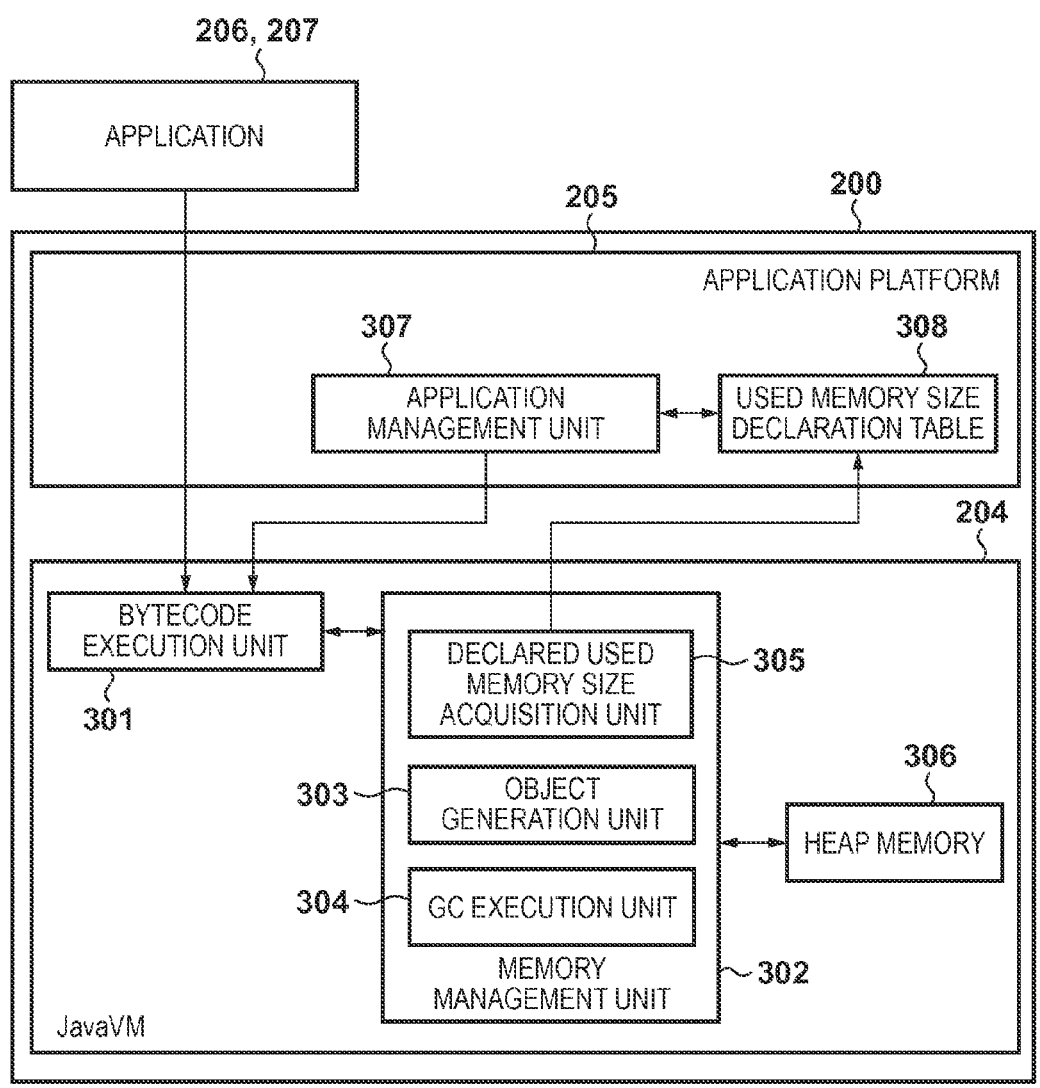
FIG. 3 shows an example of a configuration of a general image processing apparatus.

The following describes a module configuration of software 200 for a general image processing apparatus with reference to FIG. 3. As shown in FIG. 2, the software 200 is composed of the application platform 205 and the Java VM 204. The Java VM 204 includes a bytecode execution unit 301, a memory management unit 302, and a heap memory 306.

The bytecode execution unit 301 interprets and executes bytecodes, which are Java program codes. The heap memory 306 is a dynamically allocable memory area that is managed by the Java VM. The heap memory 306 holds Java objects generated through execution of Java programs. The memory management unit 302 manages memories used by applications.

The memory management unit 302 includes an object generation unit 303, a GC execution unit 304, and a declared used memory size acquisition unit 305. The object generation unit 303 generates Java objects in accordance with instructions of program codes executed by the bytecode execution unit 301. The GC execution unit 304 executes garbage collection, that is to say, deletes Java objects that are no longer in use out of Java objects stored in the heap memory 306. The declared used memory size acquisition unit 305 acquires, from a used memory size declaration table 308, a total value of memories that have been declared for use by applications.

The application platform 205 is composed of an application management unit 307 and the used memory size declaration table 308. The application management unit 307 manages application life cycles, such as installation, activation, shutdown, and uninstallation of applications 206 and 207. The used memory size declaration table 308 holds the sizes of memories that have been declared for use by the applications being executed on the application platform.

Program File

Figure 4:
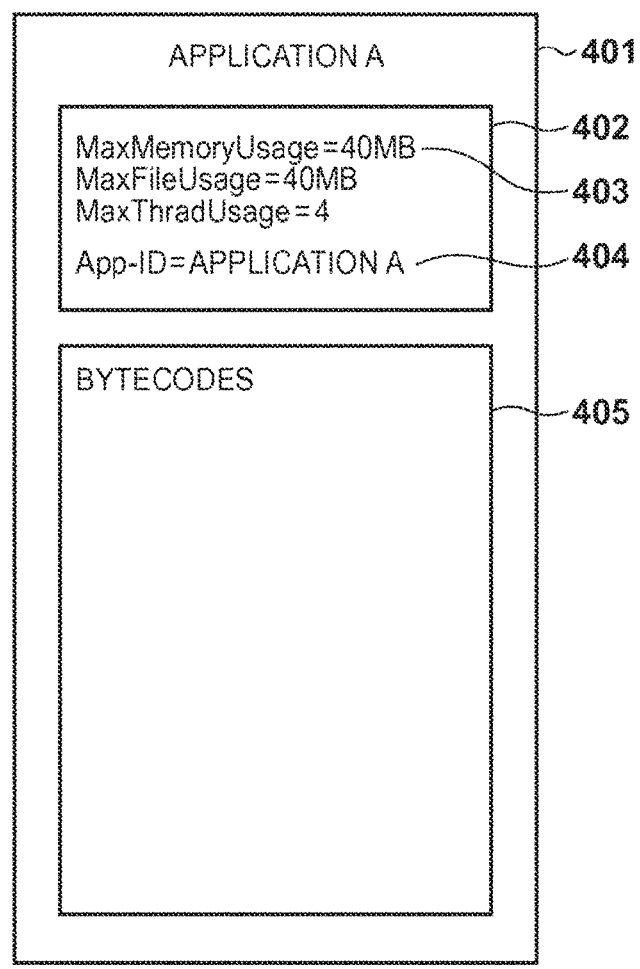
FIG. 4 shows an example of a structure of a program file of an application.

The following describes a program file 401 of a Java application with reference to FIG. 4. The program file 401 is composed of a manifest part 402, in which program information is written, and bytecodes 405. Specifically, an identifier 404 of the application, a version of the application, the maximum memory size 403 used by the application, and the like are written in the manifest part 402.

Activation Processing

A description is now given of activation processing that is executed when the application management unit 307 activates an application with reference to FIG. 5. The processing described below is realized by the CPU 101 executing a control program and the like stored in the ROM 102 on the RAM 103.

The activation processing is started upon execution of an activation instruction for an application issued by a user. In S502, the application management unit 307 loads, from the external storage device 104, the program file 401 of the application for which the activation instruction has been issued. Next, in S503, the application management unit 307 acquires the manifest part 402 from the loaded program file 401. Then, in S504, the application management unit 307 acquires a value of MaxMemoryUsage written in the acquired manifest part 402.

Thereafter, in S505, the application management unit 307 determines whether or not the acquisition of information of MaxMemoryUsage has been successful. The application management unit 307 proceeds to S506 when the acquisition has been successful, and to S511 when the acquisition has not been successful. In S511, as the information of MaxMemoryUsage has not been acquired, the application management unit 307 considers the application abnormal, determines that the activation of the application has failed, issues an activation error, and ends the processing.

In S506, the application management unit 307 acquires, from the used memory size declaration table 308, a total value of used memory sizes declared by applications that are currently activated. Next, in S507, the application management unit 307 compares the size of the heap memory 306 managed by the Java VM 204 with a sum of the value of MaxMemoryUsage acquired in S504 and the total value of the declared used memory sizes acquired in S506. The application management unit 307 then proceeds to S508 when the sum does not exceed the size of the heap memory 306. On the other hand, when the sum exceeds the size of the heap memory 306, the application management unit 307 proceeds to S511, determines that the activation of the application has failed, issues an activation error, and ends the processing.

In S508, the application management unit 307 acquires a value of App-ID, which is the application identification information written in the manifest part 402. Next, in S509, the application management unit 307 stores the value of App-ID acquired in S508 and the information of MaxMemoryUsage acquired in S504 in the used memory size declaration table 308. Thereafter, in S510, the application management unit 307 starts the execution of the application, and ends the application start processing.

Used Memory Size Declaration Table

Figure 6:
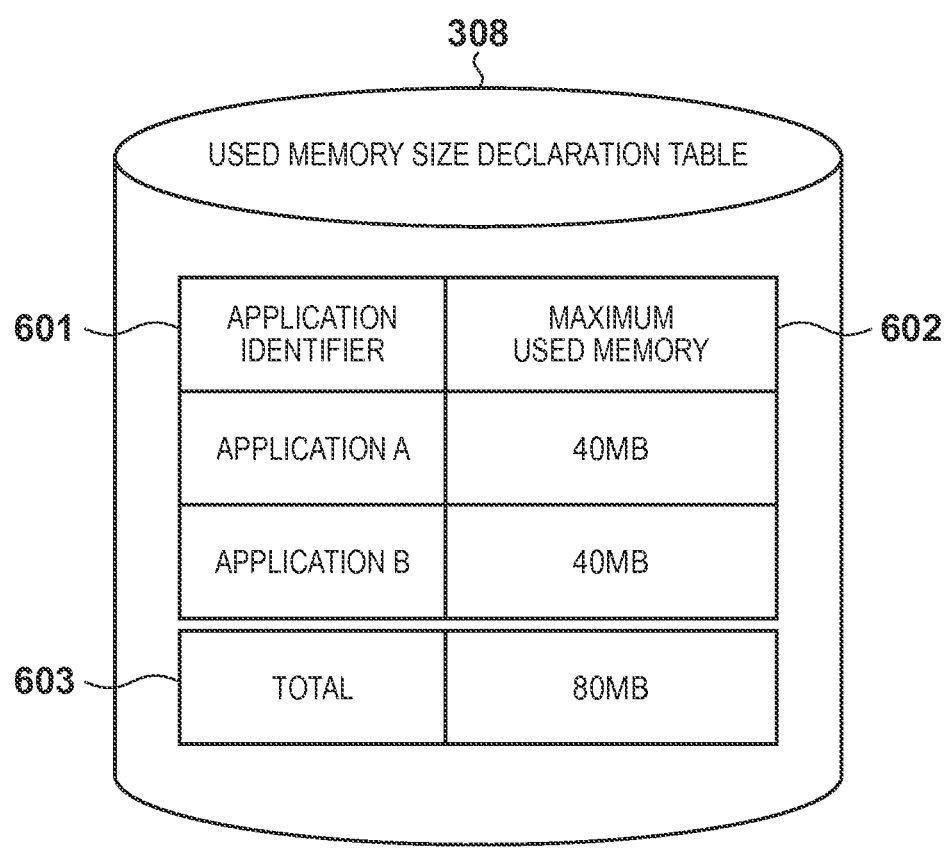
FIG. 6 shows an example of a structure of a used memory size declaration table.

Next, a description is given of the used memory size declaration table 308 with reference to FIG. 6. The used memory size declaration table 308 is composed of a table containing application identifiers 601 and maximum used memories 602 for applications, and a total value 603 of the maximum used memories. Referring to FIG. 6, two applications A and B are managed, and the maximum used memories 602 therefore have a size of 40 MB each; therefore, the total value 603 is 80 MB.

Garbage Collection by Java VM

Below is a description of garbage collection by the Java VM. In general, a Java VM performs generational memory management for high-speed processing. More specifically, a Java memory is divided into two areas, namely a new area and an old area. Based on life cycles, short-lived objects are stored in the new area, and long-lived objects are stored in the old area in addition, a Java VM includes the GC execution unit 304 as a mechanism to deallocate memories by deleting unnecessary objects from these areas. There are a plurality of types of GC algorithms. GC attributed to insufficient, space in the new area is executed using a processing method called ScavengeGC. On the other hand, GC attributed to insufficient space in the old area is executed using a processing method called FullGC.

As the new area generally has a smaller capacity than the old area, ScavengeGC, which is targeted only for the new area, is executed at high speed. On the other hand, FullGC, which is targeted for the large-capacity old area, is executed at low speed although it offers a possibility of allocating free large-capacity memories.

It should be noted that the above usage differences between ScavengeGC and FullGC and between the new area and old area are merely illustrative method of performance tuning by a combination of high-speed GC for small capacity and low-speed GC for large capacity is not limited to the above method.

Object Generation Processing

Figure 7:
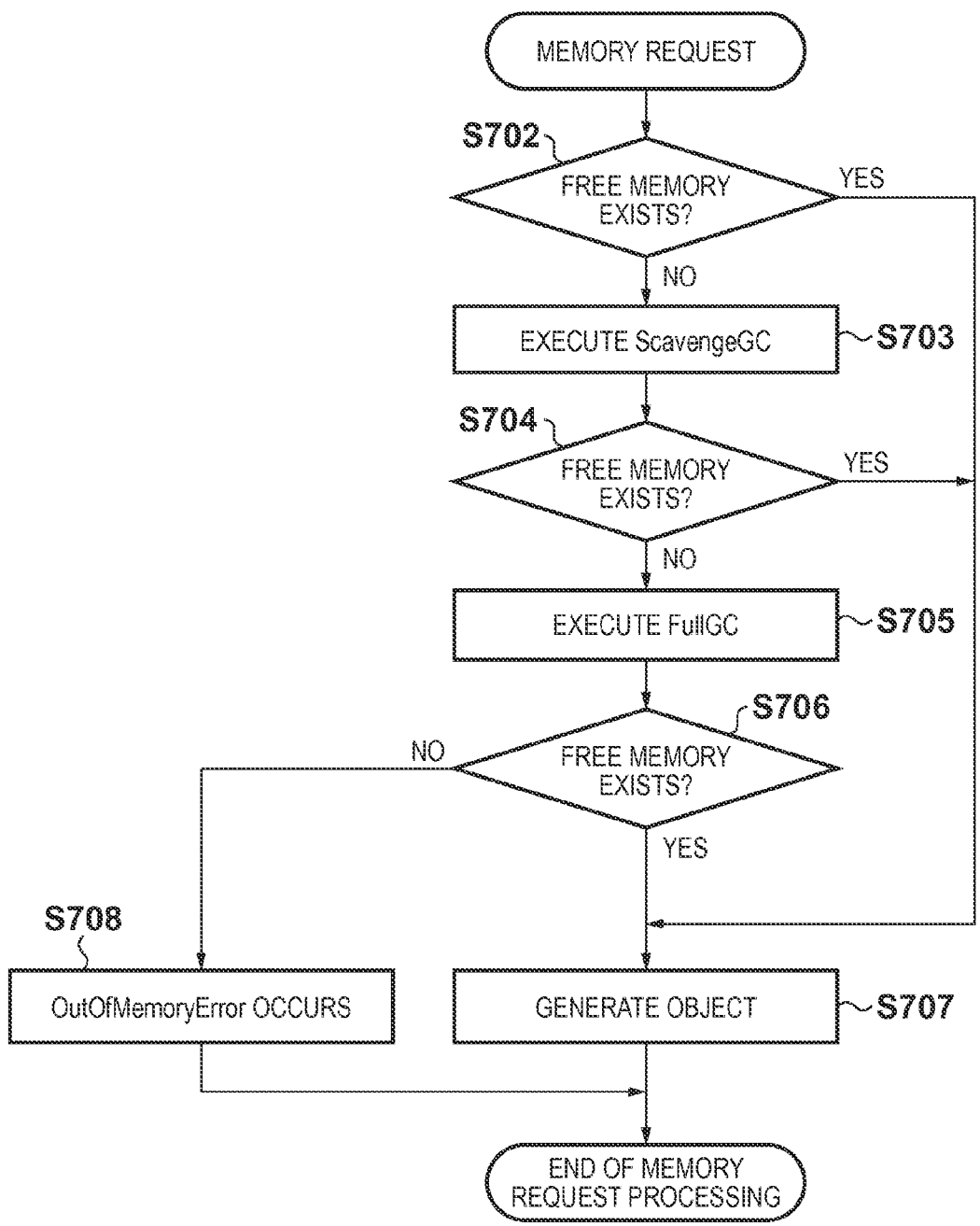
FIG. 7 is a flowchart of normal object generation processing in a Java VM.

The following describes normal object generation processing (memory request) executed on a Java VM with reference to FIG. 7. Garbage collection is executed on a Java VM when, for example, generating objects. The processing described below is realized by the CPU 101 executing a control program and the like stored in the ROM 102 on the RAM 103.

First, when the bytecode execution unit 301 executes bytecodes for generating an object for an application, the object generation unit 303 issues a memory request with a size necessary for generating the object in the new area of the heap memory. When she memory management unit 302 accepts this memory request, the following processing is started. That is so say, the memory management unit 302 operates as an example of an accepting unit.

In S702, the object generation unit 303 checks whether or not a free memory exists. When a necessary free memory exists, the object generation unit 303 proceeds to S707, generates the object using the free memory, and ends the processing. On the other hand, when no free memory exists, the processing moves to S703. In S703, the GC execution unit 304 executes ScavengeGC for the new area.

Next, in S704, the object generation unit 303 checks whether or not a necessary free memory exists in the new area. When a necessary free memory exists in the new area, the object generation unit 303 proceeds to S707, generates the object using the free memory in the new area, and ends the processing. On the other hand, when no free memory exists in the new area, the processing moves to S705. In S705, the GC execution unit 304 executes FullGC for the old area.

Thereafter, in S706, the object generation unit 303 checks whether or not a necessary free memory exists in the old area. When a necessary free memory exists in the old area, the object generation unit 303 proceeds to S707, generates the object using the free memory in the old area, and ends the processing. On the other hand, when no free memory exists in the old area, the object generation unit 303 proceeds to S708, causes the OutOfMemoryError to occur, and ends the processing.

First Embodiment

A configuration and control specific to the embodiment are described below with reference to FIGS. 8 and 9. It should be noted that the following mainly describes portions that are different from the description provided above with reference to FIGS. 1 to 7. First, a description is given of an example of a module configuration of the software 200 for an image processing apparatus of the present embodiment with reference to FIG. 8.

Figure 8:
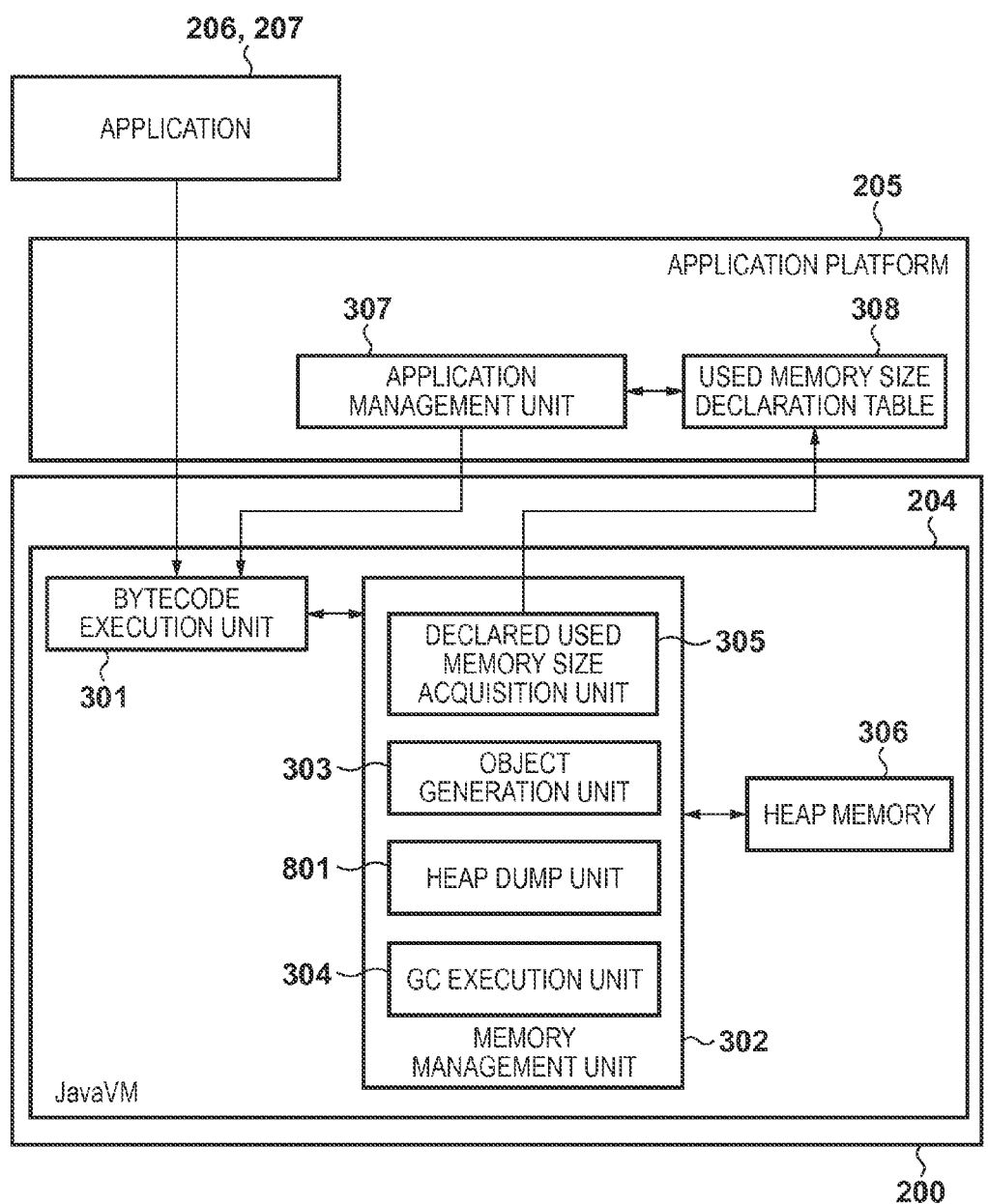
FIG. 8 shows an example of a configuration of an image processing apparatus of the first embodiment.

Referring to FIG. 8, the memory management unit 302 in the Java VM 204 includes a heap dump unit 801 in addition to the constituents shown in FIG. 3. The heap dump unit 801 executes processing for writing the contents of the heap memory to the external storage device 104 as a file.

Figure 9:
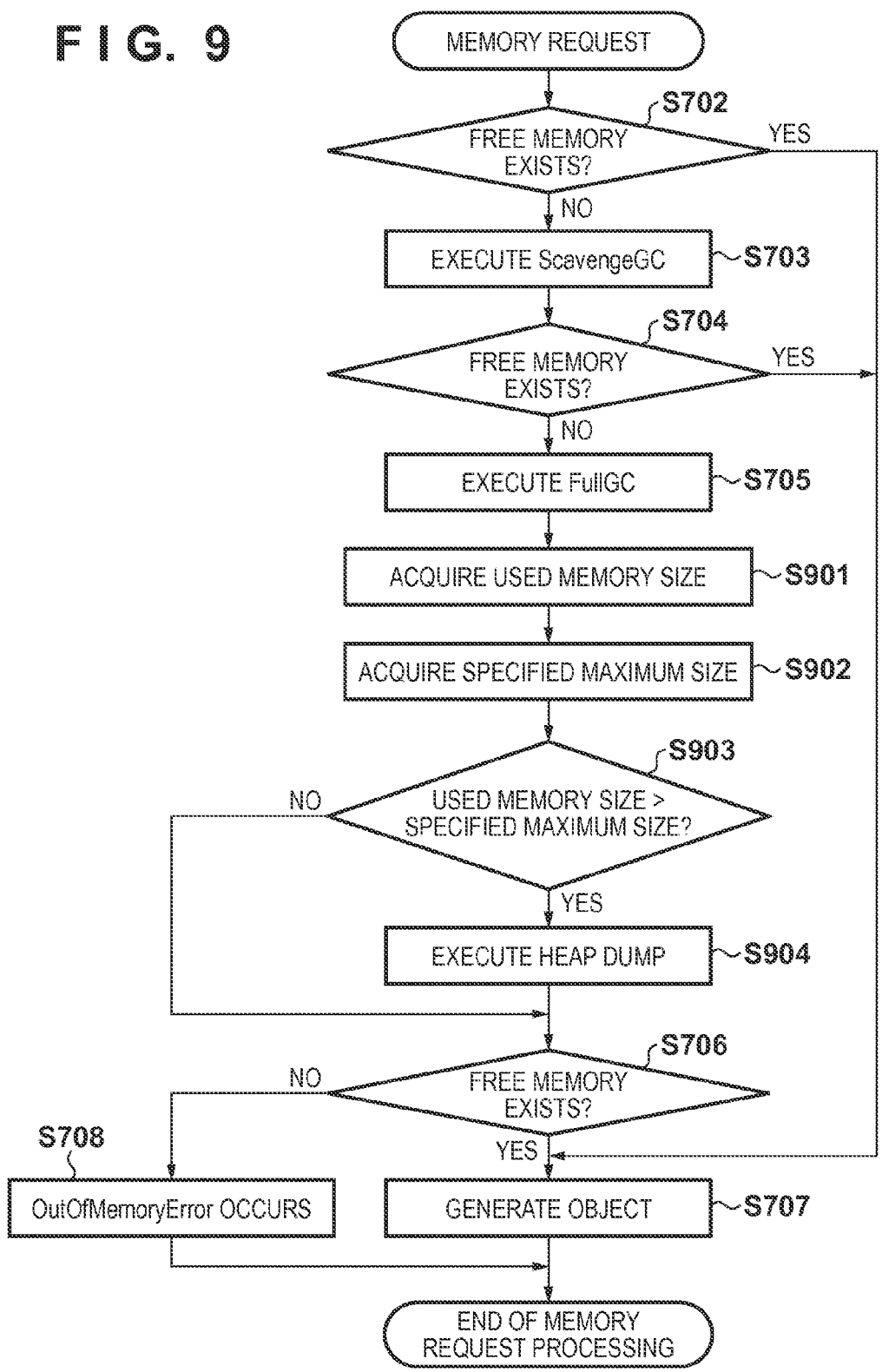
FIG. 9 is a flowchart of object generation processing of the first embodiment.

Next, a description is given of object generation processing (memory request) executed on the Java VM 204 of the present embodiment with reference to FIG. 9. The processing described below is realized by the CPU 101 executing a control program and the like stored in the ROM 102 on the RAM 103. It should be noted that processes similar to those of FIG. 7 are given the same step numbers thereas, and a description of such processes is omitted below. That is to say, the following describes the processes of S901 to S904 that are executed subsequent to the process of S705.

When FullGC is executed for the old area in S705, the processing moves to S901 in which the memory management unit 302 acquires the size of the heap memory that is currently used. Furthermore, in S902, the declared used memory size acquisition unit 305 acquires the total value 603 of the maximum used memories from the used memory size declaration table 308.

Next, in S903, the memory management unit 302 compares the size of the currently-used heap memory acquired in S901 with the total value of the maximum used memories (specified maximum size) acquired in S902. When the size of the heap memory 306 in use is smaller than or equal to the specified maximum size, the processing moves to S706. On the other hand, when the size of the heap memory 306 in use is larger than the specified maximum size, there is a possibility that the application has a problem such as a memory leak, and therefore the processing moves to S904. In S904, the heap dump unit 801 executes a heap dump (dump processing). The processing then moves to S706.

While the present processing directly compares the size of the heap memory in use acquired in S901 with the total value of the maximum used memories acquired in S902, this is merely an example. Alternatively, the size of the heap memory in use may be compared with a return value of a specific function that uses the total value of the maximum used memories acquired in S902 as an argument.

Thereafter, in S706, the memory management unit 302 checks whether or not a necessary free memory exists in the old area. When a necessary free memory exists in the old area, the processing moves to S707. The memory management unit 302 causes the object generation unit 303 to generate an object using the free memory in S707, and ends the processing. On the other hand, when no free memory exists in the old area, the memory management unit 302 proceeds to S708, causes the OutOfMemoryError to occur (error output), and ends the processing.

That is to say, in the present embodiment, when the size of the used memory is determined to exceed the specified maximum size in S903, it is determined that there is a high possibility of the occurrence of a problem such as a memory leak in the application, and the heap dump is executed for the heap memory 306. As a result, in the present embodiment, the heap dump can be executed for the heap memory when it is determined that there is a high possibility of the occurrence of a problem in the application. This makes it possible to analyze the result of the heap dump at the most appropriate timing, and to improve the efficiency of failure chasing for applications.

Second Embodiment

The second embodiment of the present invention is described below with reference to FIGS. 10 to 12. It should be noted that the following describes only the portions that are different from the above first embodiment. First, a description is given of an example of a module configuration of the software 200 for an image processing apparatus of the present invention with reference to FIG. 10. As shown in FIG. 10, the memory management unit 302 of the present embodiment includes a heap memory variation recording unit 1001 in addition to the constituents shown in FIG. 8. The heap memory variation recording unit 1001 records variation in a heap memory on a per-application basis. Below is a specific description of the heap memory variation recording unit 1001 with reference to FIG. 11.

Figure 11:
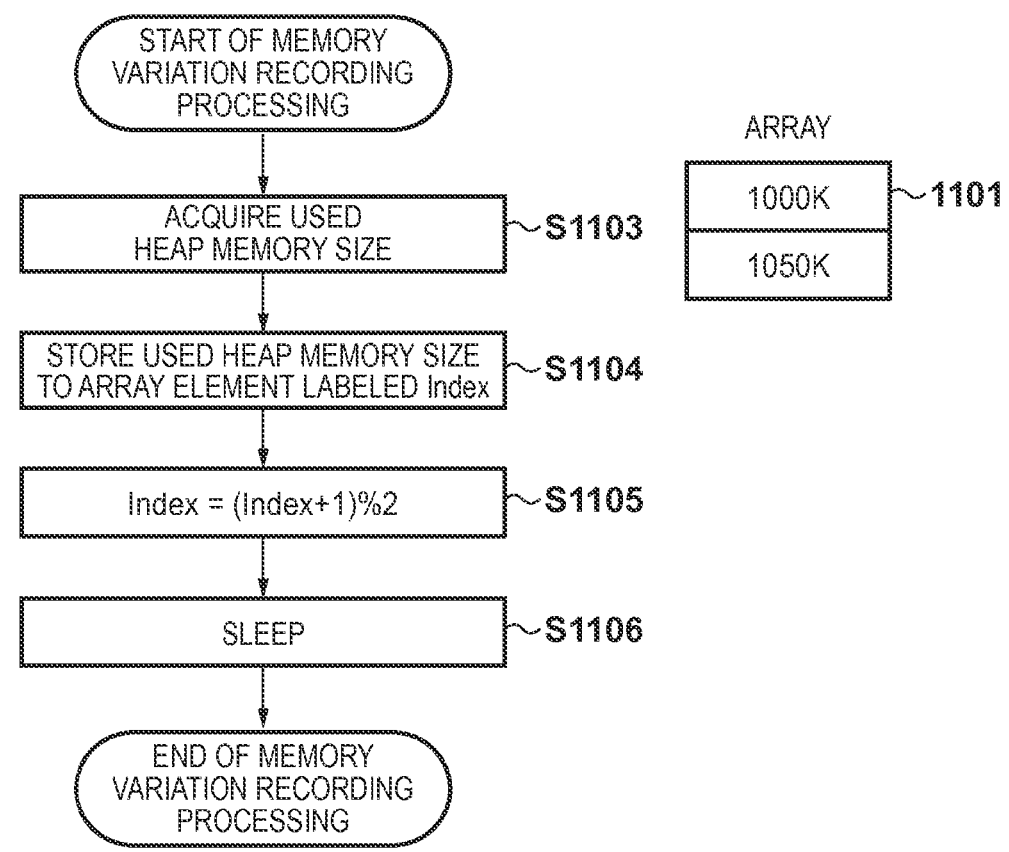
FIG. 11 is a flowchart of memory variation recording processing of the second embodiment.

FIG. 11 shows a processing procedure in which the heap memory variation recording unit 1001 records variation in the heap memory, and a two-row array 1101 for recording the variation in the heap memory held in the heap memory variation recording unit 1001. The heap memory variation recording unit 1001 may be mounted as, for example, a thread.

When memory variation recording processing is started, the heap memory variation recording unit 1001 acquires the size of a heap memory being used by a target application in S1103. Next, in S1104, the heap memory variation recording unit 1001 stores the value acquired in S1103 to an element labeled Index in the array 1101.

Thereafter, in S1105, the heap memory variation recording unit 1001 updates Index in the array 1101 to store to "Index= (Index+1)% 2". Subsequently, the heap memory variation recording unit 1001 sleeps for a time period determined in advance in S1106, and ends the heap memory variation recording processing. Immediately after ending the heap memory variation recording processing, the heap memory variation recording unit 1001 starts the next heap memory variation recording processing. That is to say, the heap memory variation recording unit 1001 periodically acquires a used heap memory size (used size).

Figure 12:
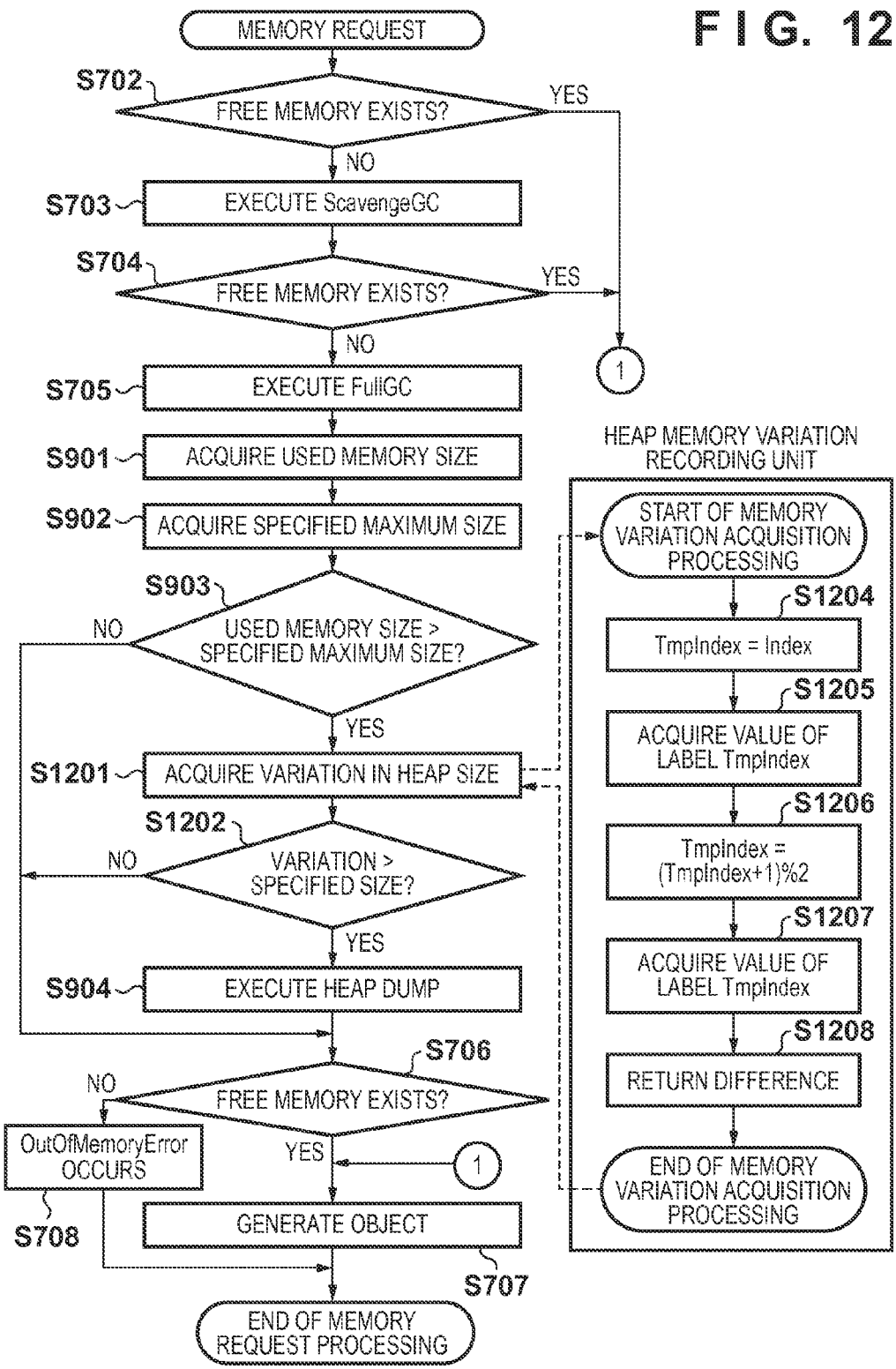
FIG. 12 is a flowchart of object generation processing of the second embodiment.

Next, a description is given of object generation processing (memory request) executed on the Java VP 204 of the present embodiment with reference to FIG. 12. The processing described, below is realized by the CPU 101 executing a control program and the like stored in the ROM 102 on the RAM 103. It should be noted that processes similar to those of FIG. 9 are given the same step numbers thereas, and a description of such processes is omitted below. That is to say, the following describes the processes of S1201 to S1208 that are executed subsequent to the process of S903.

In S903, the memory management unit 302 compares the size of the currently-used heap memory acquired in S901 with the total value of the maximum used memories acquired in S902. When the size of the heap memory in use is small, the processing moves to S706. On the other hand, when the size of the heap memory in use is large, the memory management unit 302 considers that there is a possibility of a problem such as a memory leak in the application, and proceeds to S1201. The present processing directly compares the size of the used heap memory acquired in S901 with the total value of the maximum used memories acquired in S902. This, however, is merely an example. Alternatively, the size of the heap memory in use may be compared with a return value of a specific function that uses the total value of the maximum used memories acquired in S902 as an argument.

In S1201, the memory management unit 302 acquires variation in the heap memory from the heap memory variation recording unit 1001. At this time, the heap memory variation recording unit 1001 executes the processes of S1204 to S1208, and returns the variation in the heap memory to the memory management unit 302. More specifically, upon receiving a request for acquisition of the variation in the heap memory, the heap memory variation recording unit 1001 copies the value of Index to a variable T=Index in S1204. Next, in S1205, the heap memory variation recording unit 1001 acquires the value of the label TmpIndex in the array 1101.

In S1206, the heap memory variation recording unit 1001 executes the calculation. Index=(Index+1)% 2 and updates the value of Index. Then, in S1207, the heap memory variation recording unit 1001 acquires the value of the label TmpIndex in the array 1101.

Thereafter, the heap memory variation recording unit 1001 returns the variation derived from [value acquired in S1205]− [value acquired in S1207] to the object generation unit 303 in S1208, and ends the heap memory variation acquisition processing.

In S1202, the memory management unit 302 compares the variation in the heap memory acquired in S1201 with a specific value (specified size). When the variation in the heap memory is smaller than or equal to the specific value, the processing moves to S706. On the other hand, the processing moves to S904 when the variation in the heap memory is larger than the specific value, in the present embodiment, the specific value is empirically determined to indicate abnormality of object generation codes. Alternatively, the specific value may be determined based on other conditions.

As set forth above, in the present embodiment, variation in the heap memory is recorded, and whether or not to execute the heap dump is determined in accordance with the recorded variation. More specifically, when the variation is larger than a specific value, it is determined that there is a high possibility of the occurrence of a problem such as a memory leak in the application, and the heap dump is executed. As a result, in the present embodiment, the heap dump can be executed for the heap memory when it is determined that there is a high possibility of the occurrence of a problem in the application. This makes it possible to analyze the result of the heap dump at the most appropriate timing, and to improve the efficiency of failure chasing for applications.

Third Embodiment

Figure 13:
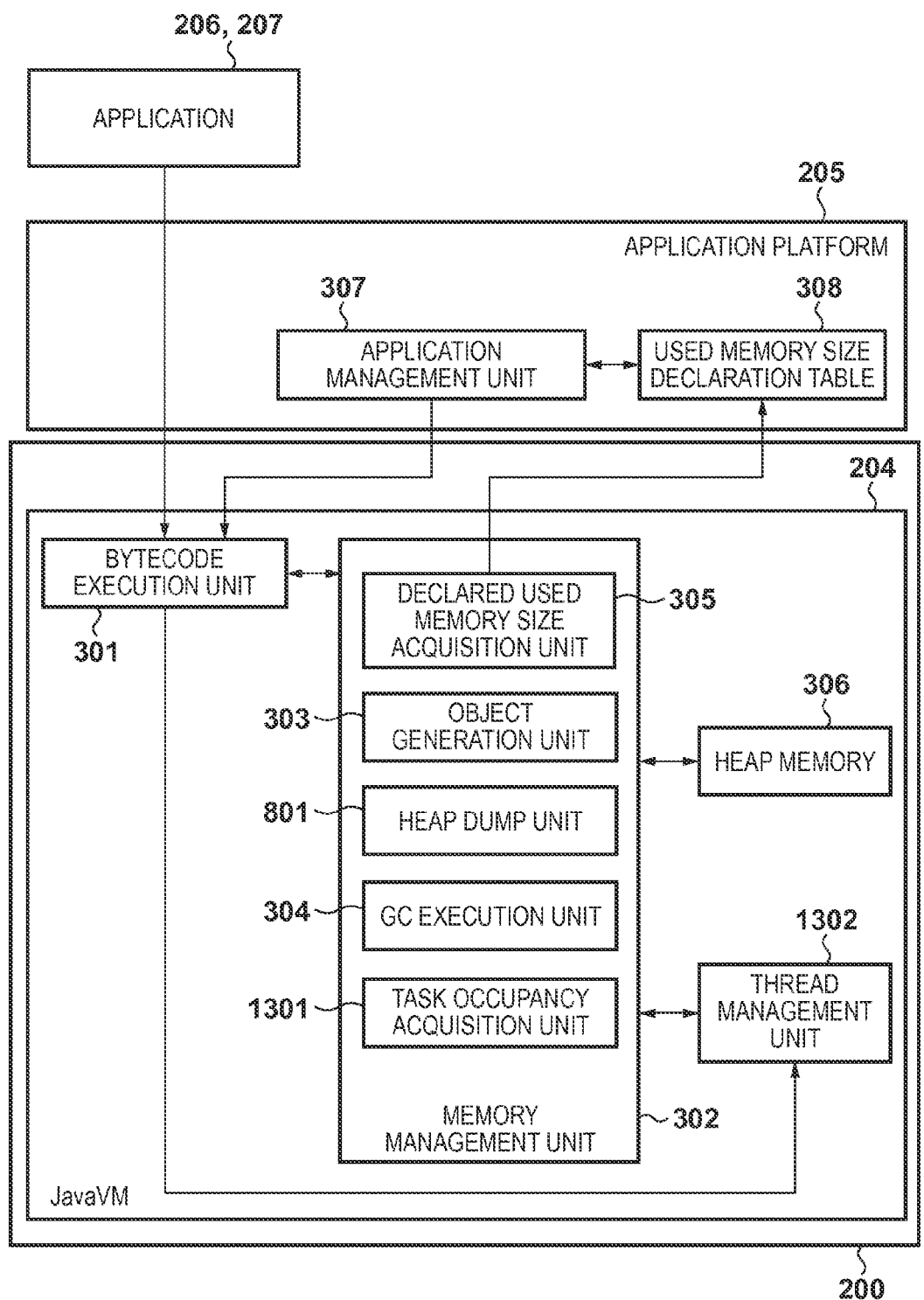
FIG. 13 shows an example of a configuration of an image processing apparatus of the third embodiment.
Figure 14:
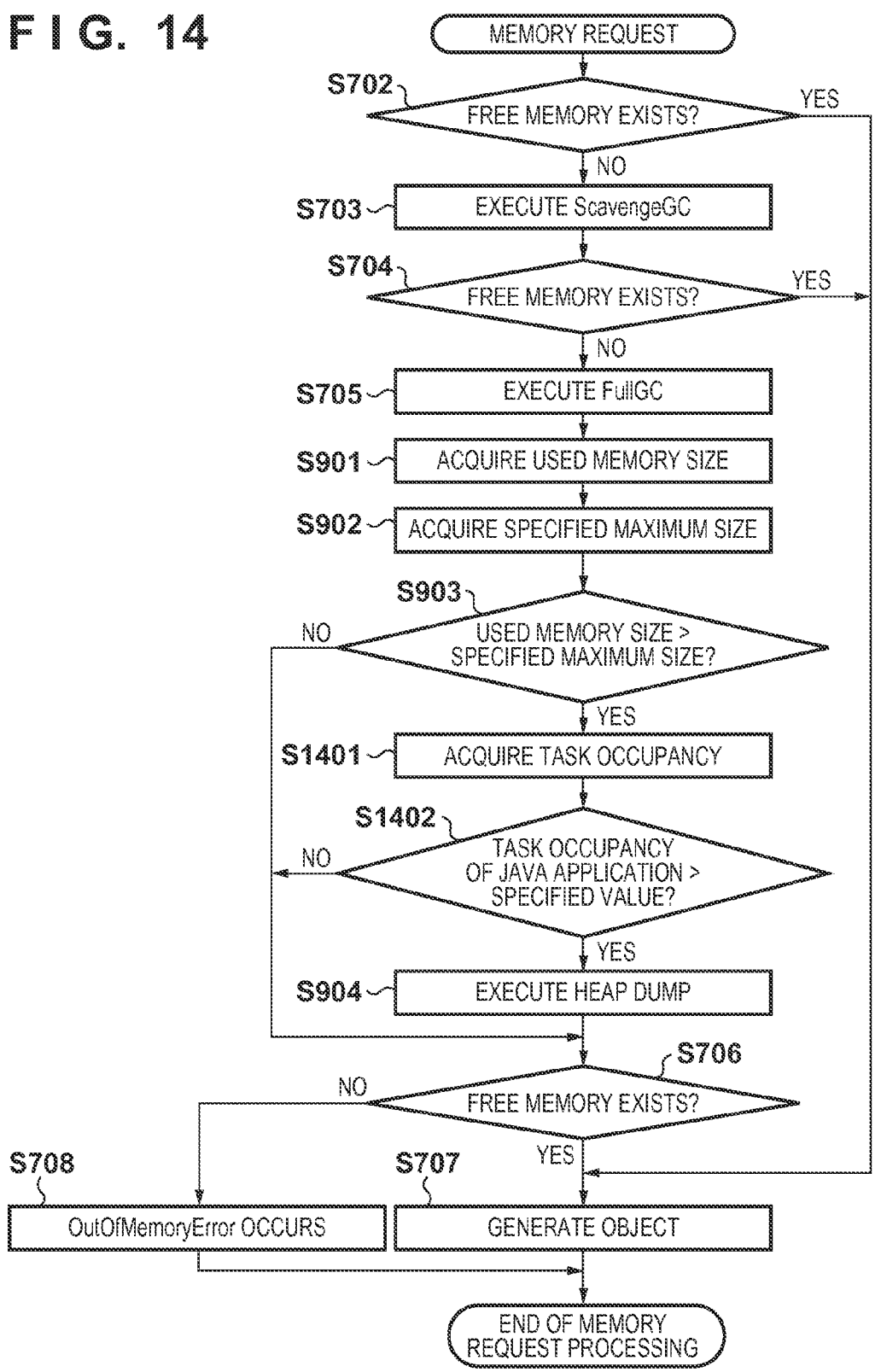
FIG. 14 is a flowchart of object generation processing of the third embodiment.

The following describes the third embodiment of the present invention with reference to FIGS. 13 and 14. First, a description is given of a module configuration of the software 200 for an image processing apparatus of the present embodiment with reference to FIG. 13. As shown in FIG. 13, the memory management unit 302 of the present embodiment includes a task occupancy acquisition unit 1301 in addition to the constituents shown in FIG. 8. Furthermore, the Java VM 204 additionally includes a thread management unit 1302 that manages threads generated by Java applications.

When a thread is generated by the bytecode execution unit 301, information of a task corresponding to that thread is added to the thread management unit 1302. When a thread is finished, information of a task corresponding to that thread is deleted from the thread management unit 1302. The task occupancy acquisition unit 1301 acquires information of tasks from the OS 202, and returns the largest one of the task occupancies stored in the thread management unit 1302. A task occupancy denotes a ratio of processing related to a task to operations of the CPU 101. In the present embodiment, the task occupancy returned by the task occupancy acquisition unit 1301 is the largest one of task occupancies of tasks corresponding to threads of Java applications. Alternatively, the task occupancy returned by the task occupancy acquisition unit 1301 may be a sum of top occupancies among occupancies of tasks corresponding to threads of Java applications.

Next, a description is given of object generation processing (memory request) executed on the Java VM 204 of the present embodiment with reference to FIG. 14. FIG. 14 is a flowchart of object generation processing of the present embodiment. The processing described below is realized by the CPU 101 executing a control program and the like stored in the ROM 102 on the PAM 103. It should be noted that processes similar to those of FIG. 9 are given the same step numbers thereas, and a description of such processes is omitted below. That is to say, the following describes the processes of S1401 and S1402 that are executed subsequent to the process of S903.

In S903, the memory management unit 302 compares the size of the currently-used heap memory acquired in S901 with the total value of the maximum used memories acquired in S902. When the size of the heap memory in use is small, the processing moves to S706. On the other hand, when the size of the heap memory in use is large, the memory management unit 302 considers that there is a possibility of a problem such as a memory leak in the application, and proceeds to S1401. The present processing directly compares the size of the used heap memory acquired in S901 with the total value of the maximum used memories acquired in S902. This, however, is merely an example. Alternatively, the size of the heap memory in use may be compared with a return value of a specific function that uses the total value of the maximum used memories acquired in S902 as an argument.

In S1401, the memory management unit 302 acquires a task occupancy of a task associated with a Java program from the task occupancy acquisition unit 1301. Next, in S1402, the memory management unit 302 determines whether or not the task occupancy acquired in S1401 exceeds a specific value. When the task occupancy is smaller than or equal to the specific value, the processing moves to S706. On the other hand, when the task occupancy is larger than the specific value, the processing moves to S904. In the present embodiment, the specific value is empirically determined to indicate abnormality of a Java program that generates an object. Alternatively, the specific value may be determined based on other conditions.

As set forth above, in the present embodiment, whether or not to execute the heap dump is determined in accordance with a task occupancy of a task. More specifically, when the task occupancy is larger than a specific value, it is determined that there is a high possibility of the occurrence of a problem such as a memory leak in the corresponding application, and the heap dump is executed. As a result, in the present embodiment, the heap dump can be executed for the heap memory when it is determined that there is a high possibility of the occurrence of a problem in the application. This makes it possible to analyze the result of the heap dump at the most appropriate timing, and to improve the efficiency of failure chasing for applications.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-226328 filed on Oct. 11, 2012, which is hereby incorporated by reference herein in its entirety.

What is claimed is:

1. An information processing apparatus comprising:
an execution unit configured to execute an application;
a storage unit configured, when the execution unit executes the application, to store a maximum size indicating a maximum memory size used by the application;
an accepting unit configured to accept a memory request from the application;
a comparing unit configured, when the accepting unit accepts the memory request, to compare a size of a used memory that is currently used for execution of the application with the maximum size of a memory used by the application, which is stored in the storage unit;
a control unit configured to perform overall control of the information processing apparatus;
an acquisition unit configured to acquire an occupancy indicating a ratio of processing for executing the application to operations of the control unit; and
a memory management unit configured to execute dump processing for writing memory contents to an external storage device only when the size of the used memory is larger than the maximum size and the occupancy acquired by the acquisition unit is larger than a specified size.

2. The information processing apparatus according to claim 1, further comprising:
a recording unit configured to record variation in the memory being used by the application, wherein
the memory management unit executes the dump processing for writing the memory contents to the external storage device only when the size of the used memory is larger than the maximum size and the variation in the memory recorded in the recording unit is larger than a specified size.

3. The information processing apparatus according to claim 2, wherein:
the recording unit periodically records a used size of the memory being used by the application, and derives the variation by comparing used sizes in different timings.

4. The information processing apparatus according to claim 1, wherein
the acquisition unit acquires an occupancy of a task associated with the application from an operation system that runs on the control unit.

5. The information processing apparatus according to claim 1, wherein
the memory management unit further outputs an error when a memory size requested through the memory request accepted by the accepting unit is not allocated in the memory.

6. The information processing apparatus according to claim 1, wherein
the application is a Java application, and
the memory is a heap memory.

7. A control method for an information processing apparatus, comprising:
executing an application;
storing, when executing the application, a maximum size indicating a maximum memory size used by the application;
accepting a memory request from the application;
comparing, upon accepting the memory request, a size of a used memory that is currently used for execution of the application with the stored maximum size of a memory used by the application;
performing overall control of the information processing apparatus;
acquiring an occupancy indicating a ratio of processing for executing the application to operations of the overall control; and
performing memory management such that dump processing is executed for writing memory contents to an external storage device only when the size of the used memory is larger than the maximum size and the occupancy is larger than a specified size.

8. A non-transitory computer-readable storage medium storing a computer program for causing a computer to execute a control method for an information processing apparatus, the method comprising:
executing an application;
storing, when executing the application, a maximum size indicating a maximum memory size used by the application;
accepting a memory request from the application;
comparing, upon accepting the memory request, a size of a used memory that is currently used for execution of the application with the stored maximum size of a memory used by the application;
performing overall control of the information processing apparatus;
acquiring an occupancy indicating a ratio of processing for executing the application to operations of the overall control; and
performing memory management such that dump processing is executed for writing memory contents to an external storage device only when the size of the used memory is larger than the maximum size and the occupancy is larger than a specified size.

* * * * *